United States Patent
Yamamoto et al.

(10) Patent No.: US 7,096,492 B2
(45) Date of Patent: Aug. 22, 2006

(54) METHODS AND DEVICES FOR CARRYING OUT USER AUTHENTICATION

(75) Inventors: Masaaki Yamamoto, Yokohama (JP); Yoshiaki Hiramatsu, Yokosuka (JP); Tatsuaki Wakabayashi, Yokosuka (JP); Hiroshi Kanto, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 781 days.

(21) Appl. No.: 10/297,731

(22) PCT Filed: Dec. 11, 2001

(86) PCT No.: PCT/JP01/10834

§ 371 (c)(1),
(2), (4) Date: Dec. 5, 2002

(87) PCT Pub. No.: WO02/48893

PCT Pub. Date: Jun. 20, 2002

(65) Prior Publication Data

US 2003/0139910 A1 Jul. 24, 2003

(30) Foreign Application Priority Data

Nov. 12, 2000 (JP) ............................. 2000-376630

(51) Int. Cl.
*G06F 1/24* (2006.01)
(52) U.S. Cl. ................. 726/5; 726/17; 726/28
(58) Field of Classification Search ............ 726/5, 726/17, 28
See application file for complete search history.

(56) References Cited

FOREIGN PATENT DOCUMENTS

| | | |
|---|---|---|
| EP | 1 061 701 A1 | 12/2000 |
| JP | 10-11383 | 1/1998 |
| JP | 10-260939 | 9/1998 |
| JP | 11-25051 | 1/1999 |
| JP | 11-168758 | 6/1999 |
| JP | 11-306171 | 11/1999 |
| JP | 2000-285078 | 10/2000 |
| NZ | 326379 | 11/1998 |
| WO | WO 00/44136 A1 | 7/2000 |

OTHER PUBLICATIONS

McCann, P.J. et al., "An Internet Infrastructure for Cellular CDMA Networks Using Mobile IP", *IEEE Personal Communications*, vol. 7, No. 4, Aug. 2000, pp. 6-12.

Hiroki, E. "Personal Computer ID Announcement. Part 2. Authentication Technology: Reliably Identifying Individual Terminals with Intrinsic Numbers (CertID) and Authentication Circuits"; *Nikkei Electronics*, 1999, No. 740, pp. 105-113 + cover page (translation included).

*Primary Examiner*—Thomas R. Peeso
(74) *Attorney, Agent, or Firm*—Brinks Hofer Gilson & Lione

(57) ABSTRACT

IP server W and gateway server GWS transmit data in HTML format in response to a request from mobile unit MS. At this stage, in the HTML data, the personal identification information request data string is added to a URL of the page corresponding to a service, which requires user authentication. As the HTML data is received by mobile unit MS, the user carries out an inputting operation to designate the URL while the image corresponding to the HTML is displayed on the liquid crystal display unit. Then, mobile unit MS reads out personal identification information from ROM, and transmits to mobile packet communication network MPN. IP server W carries out user authentication on the basis of personal identification information transmitted from mobile unit MS in this manner.

14 Claims, 15 Drawing Sheets

FIG. 3

```
<HTML>
<HEAD>
<TITLE>OO BANK</TITLE>
<META name="△△" content="△△">
</HEAD>
<CETNTER>
<H2><IMG src="△△GIF" alt="OO BANK"
height="30" width="200"><FONT color="#004000">
OO BANK</FONT></H2>
</CENTER>
<BODY>
<BR>
<A href="http://www.OObank.co.jp/△△#utn">
1.BANK REMITTANCE</A>
<FONT size="-1"><BR>
<BR>
<A href="http://www.OObank.co.jp/××#utn">
2.BALANCE INQUIRY</A>
<FONT size="-1"><BR>
</BODY>
```

FIG. 4

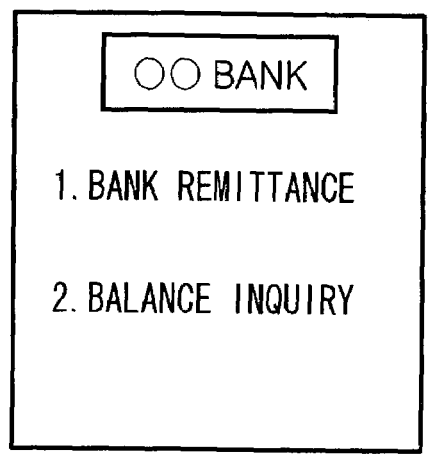

FIG. 5

| USER ID | PERSONAL IDENTIFICATION INFORMATION |
|---------|-------------------------------------|
| user.a  | △△△△△△ |
| user.b  | ■■■■■■ |
| ...     | ... |

FIG. 6

| TITLE | KEYWORD | URL |
|---|---|---|
| ○○ BANK | NET BANKING ... | https://www.○○bank.co.jp/index.html#utn |
| xx Co., Ltd. | NET AUCTION ... | http://www.xx.co.jp |
| △△ BANK | NET BANKING ... | http://www.△△bank.co.jp/index.html#utn |
| ... | ... | ... |

| URL | REQUEST DATA STRING FLAG |
|---|---|
| http//:△△.co.jp | 1 |
| http//:■■.co.jp | 0 |
| ... | ... |

FIG. 12

CAUTION!

PERSONAL IDENTIFICATION INFORMATION IS REQUESTED.

WOULD YOU LIKE TO TRANSMIT IT?

| Yes | No |

FIG. 17

| USER ID | PERSONAL IDENTIFICATION INFORMATION | PASSWORD |
|---|---|---|
| user.a | △△△△△△ | △△△△ |
| user.b | ■■■■■■ | ■■■■ |
| ... | ... | ... |

FIG. 18

LOGGING INTO A SERVICE

USER ID

PASSWORD

FIG. 19

CAUTION!

PERSONAL IDENTIFICATION INFORMATION IS REQUESTED.
PLEASE INPUT YOUR USER ID TO TRANSMIT IT.

USER ID

TRANSMIT

| USER ID | PERSONAL IDENTIFICATION INFORMATION | |
|---|---|---|
| | MOBILE UNIT | UIM |
| user.a | △△△△△△ | △△△△ |
| user.b | ■■■■■■ | ■■■■ |
| ... | ... | ... |

METHODS AND DEVICES FOR CARRYING OUT USER AUTHENTICATION

TECHNICAL FIELD

The present invention relates to some methods and devices for carrying out end-to-end user authentication between different networks.

BACKGROUND ART

In recent years, due to high functions of mobile units such as cellular telephones, a mobile unit which alone can perform WWW browsing by installing the browser of WWW (World Wide Web) (hereinafter, referred to as "WWW browser") in the mobile unit is put on the market. By using the mobile unit, a user can receive provisions of several kinds of services from the information provider on the Internet (hereinafter, referred to as "IP").

Among services provided by an IP, there are some which are only provided to users who sign a contract, or others that require secrecy; therefore, the IP which provides these types of services carries out user authentication to provide services with the object of preventing a fraudulent use by a third party. As a user authentication method, the method of using a password has been used in general. However, there is a danger that the password might leak to a fraudulent third party through the user authentication method based on the use of passwords, and anyone can use the service fraudulently once the password gets leaked. Hence, for instance, when providing a service such as a bank transaction service using NetWare (hereinafter, referred to as "net banking"), in which a complete security has to be ensured, a user authentication method, which can ensure more reliability needs to be used.

Hence, in the IP which provides this type of service, user authentication is carried out by using exclusive information such as a transmitted ID retained by a mobile communication network (hereinafter, referred to as "personal identification information"), by which a mobile unit can be identified. A brief description of this type of authentication is as follows:

i. When a service is provided to a user of a mobile unit, the server owned by the IP (hereinafter, referred to as "IP server") at first requests the mobile communication network to transmit personal identification information.

ii. The mobile communication network transmits the personal identification information to an IP server on the basis of the transmission request.

iii. An IP server carries out user authentication on the basis of the personal identification information transmitted from the mobile communication network.

Conventionally, fraudulent use by a third party has been effectively prevented by the above-mentioned user authentication method.

However, personal identification information is important information as it pertains to the privacy and the property of the user. Hence, there is a danger of causing some unexpected damage to the user of the mobile unit if the mobile communication company provides personal identification information of users to an IP without any restriction. A mobile communication company signs a contract with the IP to which personal identification information the company retains is provided beforehand to prevent such unexpected damage, and ensures the trustworthiness of the destination to which personal information is provided in this manner. Since a contract has to be signed beforehand in this method, it is not possible for an IP, which does not have a contract with a mobile communication company to use personal identification information of users, to carryout user authentication.

DISCLOSURE OF INVENTION

The object of the present invention is to provide a user authentication method and a communication system, which enable every IP to carry out user authentication by using personal identification information without having to make a contract with mobile communication companies.

To achieve the above-mentioned object, the present invention provides a user authentication method comprising: a reception process for a cellular terminal belonging to a first network to receive data from the first network; a detection process for the cellular terminal to detect whether a specific data string exists in the data received in the reception process; a transmission process for the cellular terminal to transmit personal identification information for identifying a user pre-stored in the cellular terminal with certainty, only when it is determined in the detection process that the data string exists; a forwarding process for a relaying device, which relays transmission and reception of data between the first network and a second network to forward personal identification information transmitted from the cellular terminal to the second network; and an authentication process for a server being connected to the second network to authenticate a user of the cellular terminal on the basis of the personal identification information.

In this configuration, personal identification information the cellular terminal transmits can be transmitted in a format, which cannot be read by any device other than the server. In this case, the server, in the authentication process, deciphers the personal identification information transmitted from the cellular terminal, and authenticates the user of the cellular terminal on the basis of the personal identification information.

Also, prior to the reception process, the relaying device can be equipped with a search process to search for an address of the server in the second network in accordance with a request from the cellular terminal. In this case, the data the cellular terminal receives in the reception process is data corresponding to the outcome of a search carried out by the relaying device in the search process. In one preferred embodiment, the data can be written in a markup language; and the data string can be a markup of a specific identifier in the data.

Furthermore, prior to the transmission process, the cellular terminal can be equipped with the function to carryout a determination prompting process, which the user of the cellular terminal is prompted to determine whether to transmit the personal identification information of the user only when it is determined in the detection process that the data string exists; and in the transmission process, the cellular terminal can transmit the personal identification information only when the permission of the user is obtained in the determination prompting process. In this case, in the determination prompting process, instead of only displaying an image to prompt the user's determination, prompting the user to enter input identification information, and transmitting input identification information inputted by the user along with the personal identification information in the transmission process are also possible.

Also, after the authentication process, a transmission process for the server for transmitting an input data to prompt the cellular terminal to enter input identification information after the authentication process; a process for the cellular terminal, which received the input data transmitted in the transmission process to prompt a user to enter the input identification information on the basis of the input data; a second transmission process for transmitting input identification information inputted in the process for prompting input; and a second authentication process for authenticating a user of the cellular terminal on the basis of the input identification information transmitted in the second transmission process can be further set up.

Preferably, as the personal identification information, a serial number of the cellular terminal should be used.

In this case, if a combination of a serial number of the cellular terminal and information stored in a user identification module, which is connected with the cellular terminal is further used as personal identification information, the trustworthiness of authentication can be improved. Also, as the first network, the mobile communication network can be used as well.

The present invention further provides a communication system comprising a cellular terminal for transmitting to said first network, personal identification information for identifying with certainty a user pre-stored in a terminal, by receiving data from a first network, determining whether a specific data string exists in the data, and only when said data string is determined to exist; a second network, which is connected with the first network via a relaying device; and a server, which is connected with the second network for carrying out authentication on the basis of the personal identification information.

The present invention provides a cellular terminal comprising a communication unit for carrying out communication with others via a first network; and a controlling unit, by carrying out communication, via the first network and a second network being connected with the first network, with a server in the second network by the communication unit, for reading out personal identification information from memory installed in the cellular terminal or memory connected with the cellular terminal, and transmitting to the server via the connection when data containing a specific data string is received from the server.

Also, the present invention can be carried out by an embodiment of distributing among users, a program to function as a cellular terminal in this manner via a network, or distributing by storing in a recording media such as CD or FD among users.

BRIEF DESCRIPTION OF DRAWINGS

FIG. 3 is a diagram showing an example of an HTML data source of the same embodiment.

FIG. 4 is a diagram showing an example of the image corresponding to the data shown in FIG. 3.

FIG. 5 is a diagram showing memory content of personal identification database 113 of the same embodiment.

FIG. 6 is a diagram showing memory content of search database GWS 1 of the same embodiment.

FIG. 12 is a diagram showing an example of an image displayed on liquid crystal displaying unit 24 of mobile unit MS of the same embodiment.

FIG. 17 is a diagram showing memory content of personal identification database 113 in modification example 1.

FIG. 18 is a diagram showing an example of an image displayed on liquid crystal displaying unit 24 of mobile unit MS in modification example 2.

FIG. 19 is a diagram showing an example of an image displayed on liquid crystal displaying unit 24 of mobile unit MS in the same modification example.

BEST MODE OF CARRYING OUT THE INVENTION

Hereinafter, the embodiment of the present invention is explained by referring to figures. The present embodiment is achieved by adapting the present invention for the mobile communication network, which is connected to the Internet.

1-1. CONFIGURATION OF THE EMBODIMENT

A. Configuration of the Entire System

Figure 1:
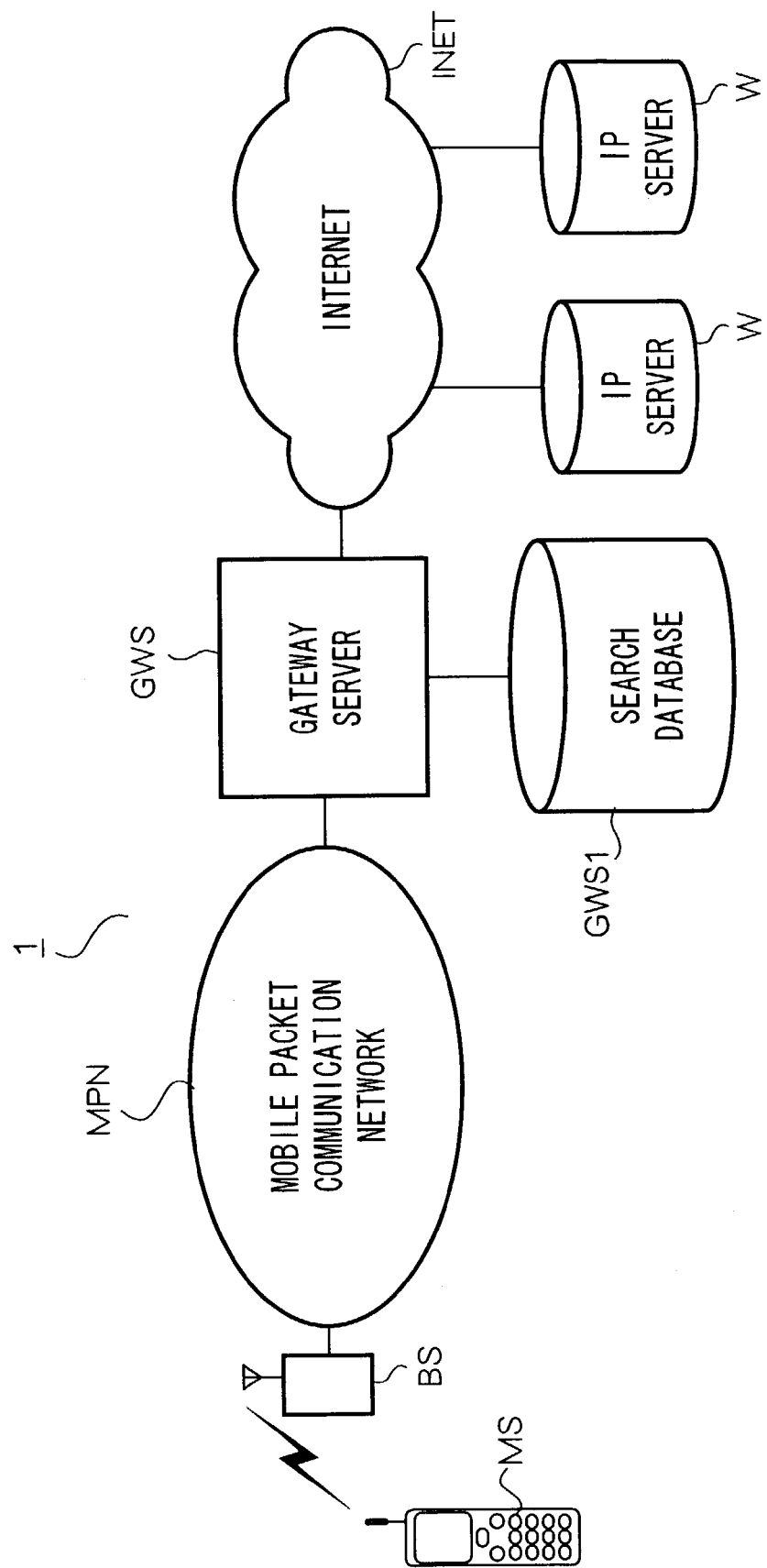
FIG. 1 is a diagram showing the entire configuration of communication system 1 of the present embodiment.

FIG. 1 is a block diagram showing the configuration of the communication system of the present embodiment.

As shown in the figure, communication system 1 of the present embodiment consists of a plurality of mobile units MS, a plurality of base stations BS, mobile packet communication network MPN, gateway server GWS, Internet INET, and a plurality of IP servers W. In FIG. 1, only one specific mobile unit, base station, and IP server from among a plurality of mobile units MS, base stations BS, and IP servers W belonging to communication system 1 are shown to avoid complicating the figure.

Mobile unit MS is a portable electronic apparatus, such as a cellular telephone, which is able to perform data communication via mobile packet communication network MPN shown in FIG. 1, and performs voice communication via the mobile telephone network (not shown). Mobile unit MS receives provision of several kinds of services from IP server W by data communication via mobile packet communication network MPN. Also, mobile unit MS stores personal identification information, and transmits personal identification information to IP server W to receive provision of a service which requires user authentication. At this stage, with regards to personal identification information, any information can be used as far as the information uniquely specifies the user, but the serial number of mobile unit MS is used in the present embodiment.

IP server W is a WWW (World Wide Web) server owned by an IP, and provides several kinds of services, such as "net banking" (for instance, "remittance", "balance inquiry" and so forth), or a service, which is specified in the membership contract of mobile unit MS.

Figure 2:
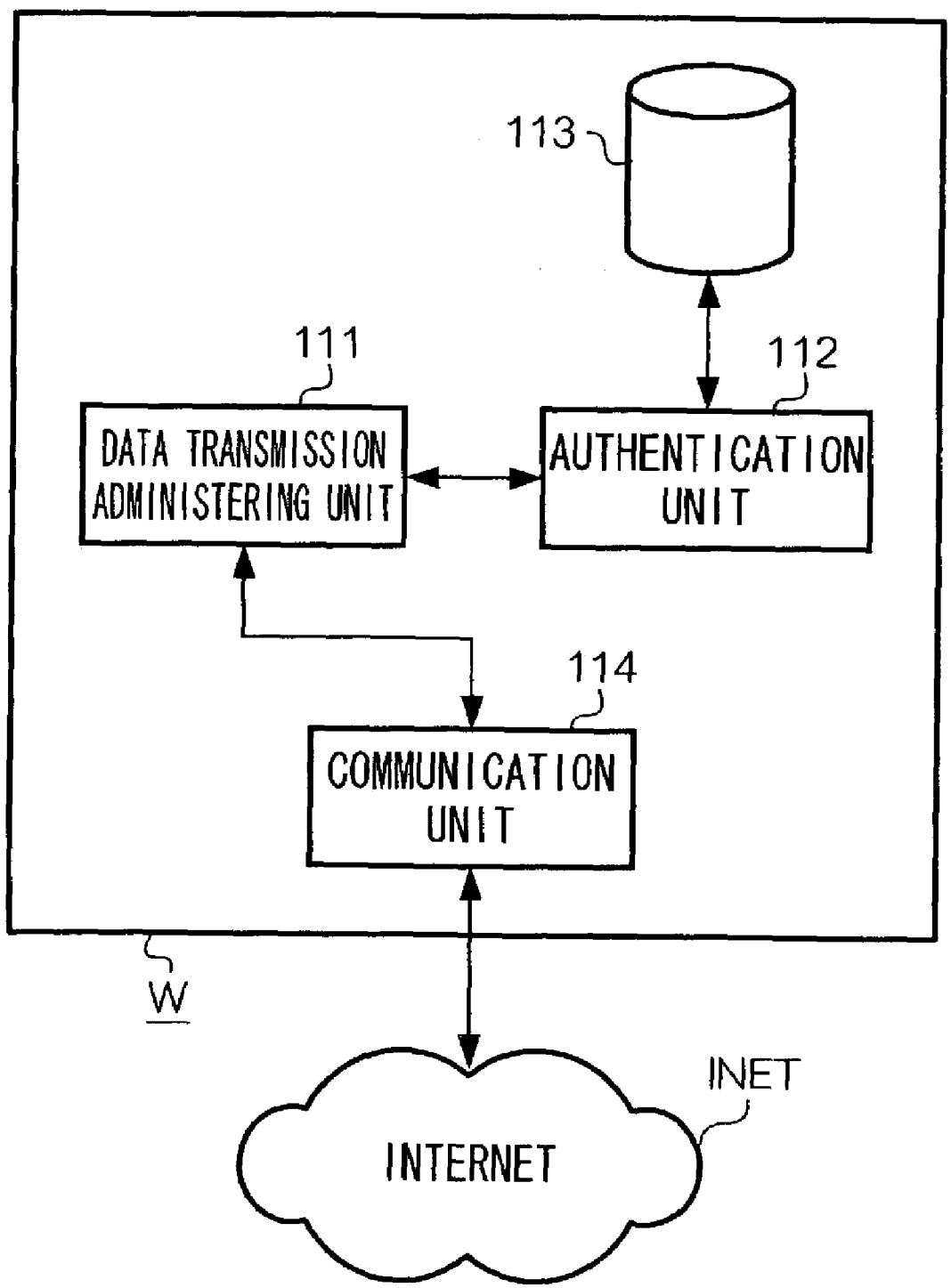
FIG. 2 is a block diagram showing a configuration of IP server W of the same embodiment.

FIG. 2 is a block diagram showing the configuration of IP server W. As shown in the figure, IP server W consists of data transmission administering unit 111, authentication unit 112, personal identification database 113, and communication unit 114.

Data transmission administering unit 111, for instance, consists of CPU (Central Processing Unit), ROM (Read Only Memory), and a hard disc (all of which are not shown). In the hard disc, are stored some data in HTML (Hyper Text Markup Language) format corresponding to resources such as a homepage or Web Page (hereinafter, referred to as "HTML data"), and a URL is set up for each HTML data. In Rom is stored a controlling program which transmits data, when a message in HTTP (Hyper Text is Transfer Protocol) or HTTPS using GET method (hereinafter, referred to as "GET request") is received from mobile unit MS, in response to the GET request. CPU executes several kinds of processes in accordance with these programs. RAM is used as the work area of CPU.

At this stage, among the HTML data transmitted from data transmission administering unit 111 to Internet INET in the present embodiment, there are some characteristic configurations, which conventionally have not existed.

FIG. 3 shows an example of HTML data's source in the present embodiment, and FIG. 4 is a diagram showing an example of an image corresponding to the data shown in FIG. 3. In FIG. 3, <A herf=""></A> is an anchor tag, and the URL corresponding to the page pertaining to the service, which IP server W can provide to mobile unit MS is designated by the anchor tag.

In the menu item "Remittance" in FIG. 4, the anchor tag <A herf="http://www.○○.co.jp/ΔΔ#utn"></A> shown in FIG. 3 is attached, and at the end of the URL designated by the anchor tag, is attached a data string "utn." The data string "utn" is a data string showing that IP server W requests the transmission of personal identification information (hereinafter, the letter string "utn" is referred to as "personal identification information request data string").

As explained above, among services provided by IP server W to mobile unit MS, there are some which require user authentication such as a "net banking" service, or a service which is specified in the membership contract. In some of the above-mentioned HTML data, personal identification information request data string "utn" is added to a URL of a page pertaining to a service of these types. Then, as an HTML data containing a URL to which personal identification information request data string "utn" is added is received by mobile unit MS, and the URL is designated by mobile unit MS, mobile unit MS transmits the GET request containing the URL after adding personal identification information prestored in mobile unit MS, to the GET request. Thus, as the GET request containing personal identification information is transmitted from mobile unit MS, data transmission administering unit 111 extracts the URL contained in the GET request, and transmits to authentication unit 112.

Authentication unit 112 carries out user authentication on the basis of personal identification information transmitted from data transmission administering unit 111 and information stored in personal identification database 113.

FIG. 5 is a diagram showing memory content of personal identification database 113. As shown in the figure, personal identification information corresponding to each user ID is stored in personal identification database 113. At this stage, user IDs stored in personal identification database 113 are IDs given to each user by IP server W. If the service provided to the user by IP server W, for instance, is a "net banking" service, the user ID is used to identify the bank account of the user. On the other hand, if the service provided by IP server W is the transmission of contents, the user ID is used for calculating a service charge.

Also, registration of personal information or user IDs with personal identification database 113 can be achieved in several manners. For instance, the configuration can be such that the user registers at a service counter of the IP, which owns IP server W by showing the serial number of mobile unit MS to the employee. Also, the configuration can be such that the IP establishes a site by which SSL (Security Sockets Layer) communication can be performed, and the user registers personal identification information by accessing the site by using mobile unit MS. When this method is adopted, personal identification information such as a serial number stored in mobile unit MS needs to be transmitted after adding personal identification request data string to the HTML data corresponding to the page of the site.

As personal identification information is transmitted from data transmission administering unit 111, authentication unit 112 searches personal identification database 113 on the basis of the personal identification information. Then, if there is information, which accords with the personal identification information in personal identification database 113, the user ID corresponding to the personal identification information is read out. Then, several kinds of services are provided in accordance with the user ID. On the other hand, if there is no information, which accords with the personal identification information in personal identification database 113, authentication unit 112 determines that the user of the mobile unit does not own the proper right, and refuses provision of services.

Communication unit 114 relays transmission and reception of the data between Internet INET and data transmission administering unit 111. Specifically, communication unit 114 transmits the data sent from Internet INET to data transmission administering unit 111, and transmits the data sent from data transmission administering unit 111 to Internet INET.

Next, mobile packet communication network MPN is a communication network for providing a packet communication service to mobile unit MS, consisting of gateway server GWS and a plurality of base stations BS, and is equipped with the packet subscriber processing unit (not shown).

Gateway server GWS is a computer system installed in the mobile packet gateway relaying station to connect Internet INET to mobile packet communication network MPN, and relays reception and transmission of data between different networks. Specifically, gateway server GWS transmits the data transmitted from mobile unit MS of mobile packet communication network MPN to Internet INET after converting its protocol to adapt to TCP/IP (Transmission Control Protocol/Internet Protocol) which Internet INET complies with. Also, gateway server GWS converts the data transmitted from Internet INET to the transmission protocol for mobile packet communication network MPN, and transmits to mobile packet communication network MPN.

Also, as gateway server GWS receives a GET request in HTTP transmitted from mobile unit MS, gateway server GWS checks the URL contained in the GET request, and forwards the GET request to Internet INET if the URL is general on Internet INET. Then, the data returned from Internet INET in response to the GET request is forwarded to mobile packet communication network MPN.

Also, as gateway server GWS receives a GET request in HTTPS from mobile unit MS, it checks the URL contained in the GET request, and enables the SSL site corresponding to the URL and mobile unit MS to directly communicate with each other.

Furthermore, gateway server GWS produces HTML data corresponding to, for instance a homepage, a Web page and so forth, in response to the request from mobile unit MS. Gateway server GWS provides several kinds of services to mobile unit MS by transmitting the HTML data to mobile unit MS. A service gateway server GWS provides to mobile unit MS, for instance, is a search service of IP server W and so forth. To provide the search service, gateway server GWS is equipped with search database GWS 1.

FIG. 6 is a diagram showing memory content of search database GWS 1. As shown in the figure, in search database GWS 1, are stored some keywords for search corresponding to titles of each page stored in IP server W and the URL corresponding to the page. At this stage, among URLs stored in search database GWS 1, a personal identification data string (in other words, "utn") is added to the URLs of pages pertaining to services, which require user authentication. For instance, in the example shown in the figure, the pre-stored URLs which correspond to "○○Bank" or "ΔΔ Bank" (in other words, "http://www. ○○ bank.co.jp/index.html#utn" or "http:H/www. ΔΔ bank.co.jp/index.html#utn") are the equivalents of such URLs.

Gateway server GWS searches search database GWS 1 on the basis of a request from mobile unit MS. Then, gateway server GWS transmits the URL hit as a result of the search to Internet INET by producing an HTML data specified by the anchor tag. For instance, in the case shown in FIG. 6, if the title "○○ Bank" is hit, gateway server GWS reads out the URL "https://www. ○○ bank.cojp/index.html#utn", produces HTML data containing the URL, and transmits to mobile packet communication network MPN.

B. Configuration of Mobile Unit MS

Figures 7, 8:
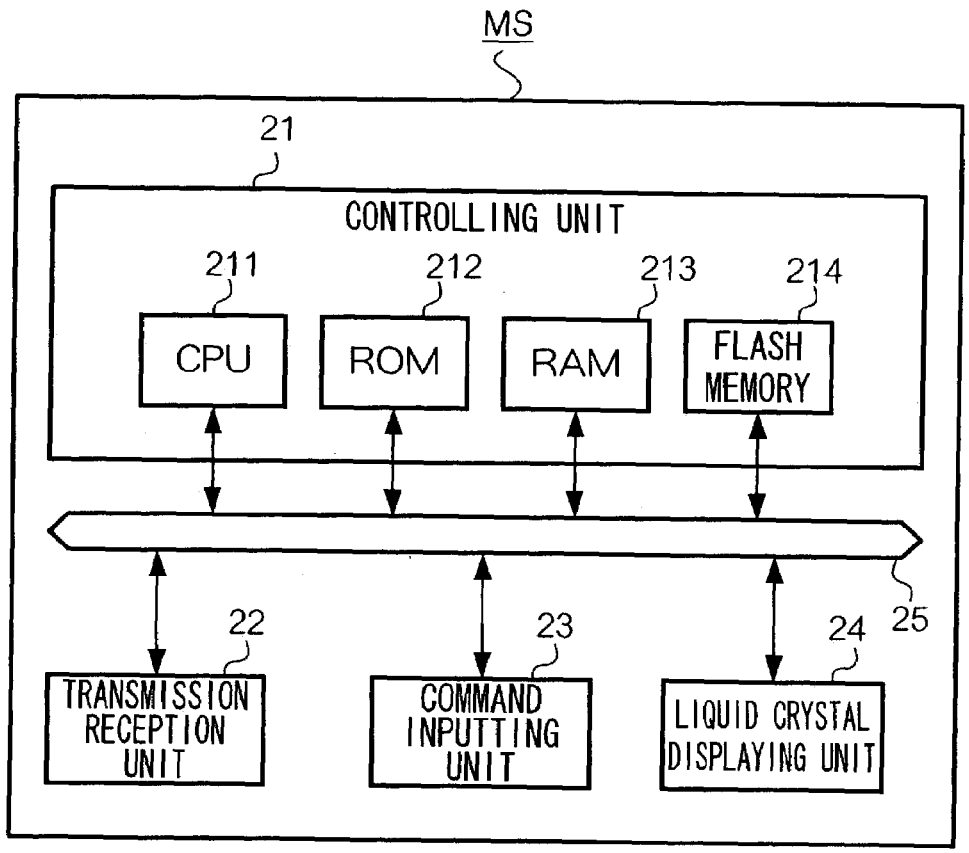
FIG. 7 is a block diagram showing a configuration of mobile unit MS of the same embodiment.
FIG. 8 is a diagram showing memory content of record storage table TBL of the same embodiment.

FIG. 7 is a block diagram showing a configuration of mobile unit MS of the present embodiment.

As shown in the figure, mobile unit MS is equipped with controlling unit 21, transmission and reception unit 22, command inputting unit 23, liquid crystal displaying unit 24, and bus 25 for relaying transmission and reception of data between each element.

Transmission and reception unit 22 performs radio communication with base station BS of mobile packet communication network MPN.

Command inputting unit 23 consists of several kinds of buttons such as PB (push button) and cursor keys, and as an inputting operation is carried out by a user, the operation data corresponding to the inputting operation is provided to CPU 211 of controlling unit 22. CPU 211 identifies the inputted command by the user from the operation data, and executes the command.

Liquid crystal displaying unit 24 consists of displaying devices such as a liquid crystal panel, and displays several kinds of information under the control of controlling unit 21.

Controlling unit 21 consists of CPU 211, ROM 212, RAM 213 and flash memory 214, and controls each unit of mobile unit MS. In ROM 212, are contained the serial number of mobile unit MS as personal identification information, the controlling program for controlling the entire mobile unit MS, several kinds of controlling information, and the WWW browser for displaying, by obtaining data desired from other communication device (such as IP server W), the image corresponding to that obtained data. RAM 213 is used as the work area of CPU 211.

CPU 211 executes several kinds of processes in accordance with several kinds of controlling programs stored in ROM 212. For instance, as CPU 211 reads out the WWW browser stored in ROM 212 and executes, the following process is carried out in that execution procedure. In other words, as the user designates the desired URL by command inputting unit 23, CPU 211, on the basis of the inputted command from command inputting unit 23, carries out the process for transmitting the GET request in HTTP or HTTPS containing the URL to mobile packet communication network MPN.

Also, during this process, personal identification information request data string "utn" is added to the URL designated from command inputting unit 23 in some cases. In that case, CPU 211 reads out personal identification information (serial number) stored in ROM 212, and transmits the GET request to which personal identification information request data string "utn" is added. Then, as the HTML data corresponding to the GET request is returned from IP server W or gateway server GWS, CPU 211 writes the HTML data on RAM 213, and displays the image corresponding to the HTML data on liquid crystal displaying unit 24.

Flash memory 214 is equipped with record storage table TBL shown in FIG. 8 to register access records. As shown in the figure, in record storage table TBL, is contained URLs of resources, which the user has accessed by using mobile unit MS as access records (hereinafter, the URL as access record is referred to as "record URL"). Also, corresponding to each record URL, request data string flag F showing whether personal identification information request data string "utn" is added to the URL is stored. If request data string F is "1", it shows that the request data string was added to the URL, and if request data string F is "0", it means that the request data string was not added to the URL.

In some cases, after failing to download the HTML data from IP server W, mobile unit MS makes another attempt to download the HTML data again. In that case, mobile unit MS reads out request data string flag F in record storage table TBL, and determines whether to transmit personal identification information. Specifically, when request data string flag F of the URL corresponding to the page to be read again is "1", controlling unit 21 transmits a GET request after adding personal identification information to IP server W. On the other hand, when request data string flag F is "0", controlling unit 21 merely transmits a GET request containing the URL corresponding to the page without adding personal identification information.

1-2 OPERATIONS OF THE EMBODIMENT

Hereinafter, by referring to figures, operations of the communication system of the present embodiment are explained. In the following explanation, the memory contents of personal identification database 113 and search database GWS 1 are the same as those of FIG. 5 and FIG. 6, and the serial number of mobile unit MS is "ΔΔΔΔΔΔ" to make the explanation more specific.

Firstly, in the instance that a user notices that he/she has forgotten to pay the apartment rent through bank remittance, he/she performs an inputting operation to carry out browsing by command inputting unit 23 of mobile unit MS to receive the "net banking" service by searching the homepage of "○○ bank" in which he/she has an account by using the search service of gateway server GWS. In accordance with the input by command inputting unit 23, CPU 211 reads out the WWW browser from ROM 212, and carries out packet registration with the packet subscriber-processing unit (figure is omitted). Packet registration is a registration process for mobile unit MS to perform packet exchanges with mobile packet communication network MPN. Thus, as packet registration is carried out, mobile unit MS is able to perform packet exchanges with gateway server GWS.

Figure 9:
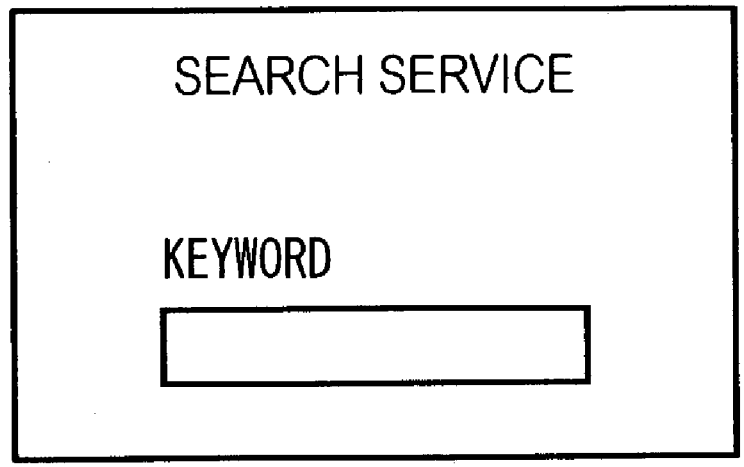
FIG. 9 is a diagram showing an example of an image displayed on liquid crystal displaying unit 24 of mobile unit MS of the same embodiment.

Hereinafter, as the user inputs the URL corresponding to the search service of gateway server GES by command inputting unit 23 of mobile unit MS, mobile unit MS transmits a GET request containing the URL to mobile packet communication network MPN. As gateway server GWS receives the GET request, it transmits the HTML data corresponding to the search image to mobile packet communication network MPN. The configuration of the search image can be in any fashion, but in the present embodiment, the configuration is such that letter strings for search are inputted in the box portion under the letter string "keyword" as shown in FIG. 9.

Then, the HTML data corresponding to the search image is received by transmission and reception unit 22 of mobile unit MS, and is transmitted to CPU 211. As a result, the search image corresponding to the HTML data (refer to FIG. 9) is displayed on liquid crystal displaying Is unit 24. At this stage, the user inputs the letter strings for search corresponding to the service he/she wishes to search (in other words, the letter strings for search "net banking") by command inputting unit 23 of mobile unit MS, and carries out the inputting operation to determine. As a result, CPU 211 of mobile unit MS transmits the GET request to which the letter strings are added to mobile packet communication network MPN.

Then, as the GET request is received by gateway server GWS, gateway server GWS extracts the letter strings for the necessary search, contained in the GET request (in other words, the letter strings for the search, "net banking"). Gateway server GWS, on the basis of the letter strings for the "net banking" search, searches search database GWS 1. As a result, the URLs corresponding to "○○ bank" or "ΔΔ bank" are selected on the basis of the key word "net banking" within search database GWS 1 (refer to FIG. 6).

Then, gateway server GWS reads out the URLs "https://www. ○○ bank.co.jp/index.html#utn" and "http://www. ΔΔ bank.co jp/index.html#utn" corresponding to "○○ bank" and "ΔΔ bank" from search database GWS 1. At this stage, since "net banking" is a service which requires security as described above, personal identification information request data string "utn" is contained in the URLs of the pages corresponding to these services. Then, gateway server GWS produces HTML data designated by the anchor tag for the URLs corresponding to "○○ bank" and "ΔΔ bank" read out from search database GWS 1, and transmits to mobile packet communication network MPN.

Figure 10:
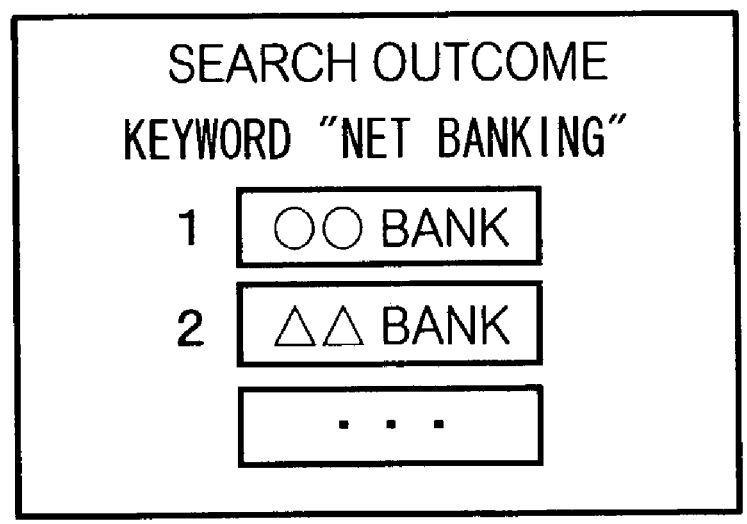
FIG. 10 is a diagram showing an example of an image displayed on liquid crystal displaying unit 24 of mobile unit MS of the same embodiment.

Then, the HTML data is received by transmission and reception unit 22 of mobile unit MS, and is transmitted to CPU 211. CPU 211 displays the image corresponding to the transmitted HTML data on liquid crystal displaying unit 24. As a result, the titles (such as, "○○ bank" and "ΔΔ bank") are selected as a result of the search carried out by gateway server GWS are displayed as menu items on liquid crystal displaying unit 24 as shown in FIG. 10.

At this stage, as the user carries out an inputting operation to choose the menu item corresponding to the name of the bank in which he/she has an account (in other words, "○○ bank") by command inputting unit 23 of mobile unit MS, the letter strings corresponding to the menu item are highlighted. In the highlighted condition, as the user carries out an inputting operation to determine by command inputting unit 23, CPU 211 of mobile unit MS executes the process shown in FIG. 11.

During this process, CPU 211 first extracts the URL "https://www. ○○bank.co.jp/index.html#utn" corresponding to the menu item chosen "○○bank", and determines whether personal identification information request data string (in other words, "utn") is contained in the URL.

In the instance that, personal information request data string is not contained in the extracted URL (Step S2 "No"), CPU 211 determines whether the URL designates an SSL communication (Step S9). At this stage, CPU 211 determines whether the URL designates an SSL communication on the basis of whether the URL begins with "http" or "https." Then, if the URL designates the SSL communication (Step S9 "Yes"), CPU 211 executes the process to commence the SSL communication (Step S10), and transmits a GET request (Step S11). On the other hand, if the URL does not designate an SSL communication (Step S9 "No"), CPU 211 transmits a GET request without the SSL handshake (Step S11). Then, CPU 211 stores the URL as an access record and "0" as request data string flag F in record storage table TBL of flash memory 214 (Step S12).

Differences in operation at this stage will be explained in detail later on.

On the other hand, in this instance, the menu item "○○ bank " is chosen. Hence, in the URL extracted by CPU 211, is contained the personal information request data string (Step S2 "Yes"). In this case, CPU 211 displays the image shown in FIG. 12 on liquid crystal displaying unit 24 (Step S3). In other words, a letter string to prompt a user to make a decision such as, "Personal identification information is requested. Would you like to transmit it?", along with "Yes" and "No" buttons, are displayed on the liquid display unit 24 of mobile unit MS. At this stage, if the user hits the "No" button, CPU 211 determines a "No" in Step S4, and ends the process.

On the other hand, if the user carries out an inputting operation selecting a "Yes", CPU 211 determines a "Yes" in Step S4, and determines whether the URL extracted in Step S1 designates SSL communication (Step S5). At this state, CPU 211 determines whether the URL designates SSL communication on the basis of whether the URL begins with "http" or "https." Then, in accordance with the outcome of the determination in Step S5, two different processes, as described below, are executed in communication system 1.

(i) Process 1

This process is executed when the URL is determined to designate SSL communication (in other words, Step S5 "Yes"). For instance, when the URL which begins with "https" as the URL "https://www.○○ bank.co.jp/index.html#utn" corresponding to the menu item "○○ bank" is designated, Process 1 is executed.

Figure 13:
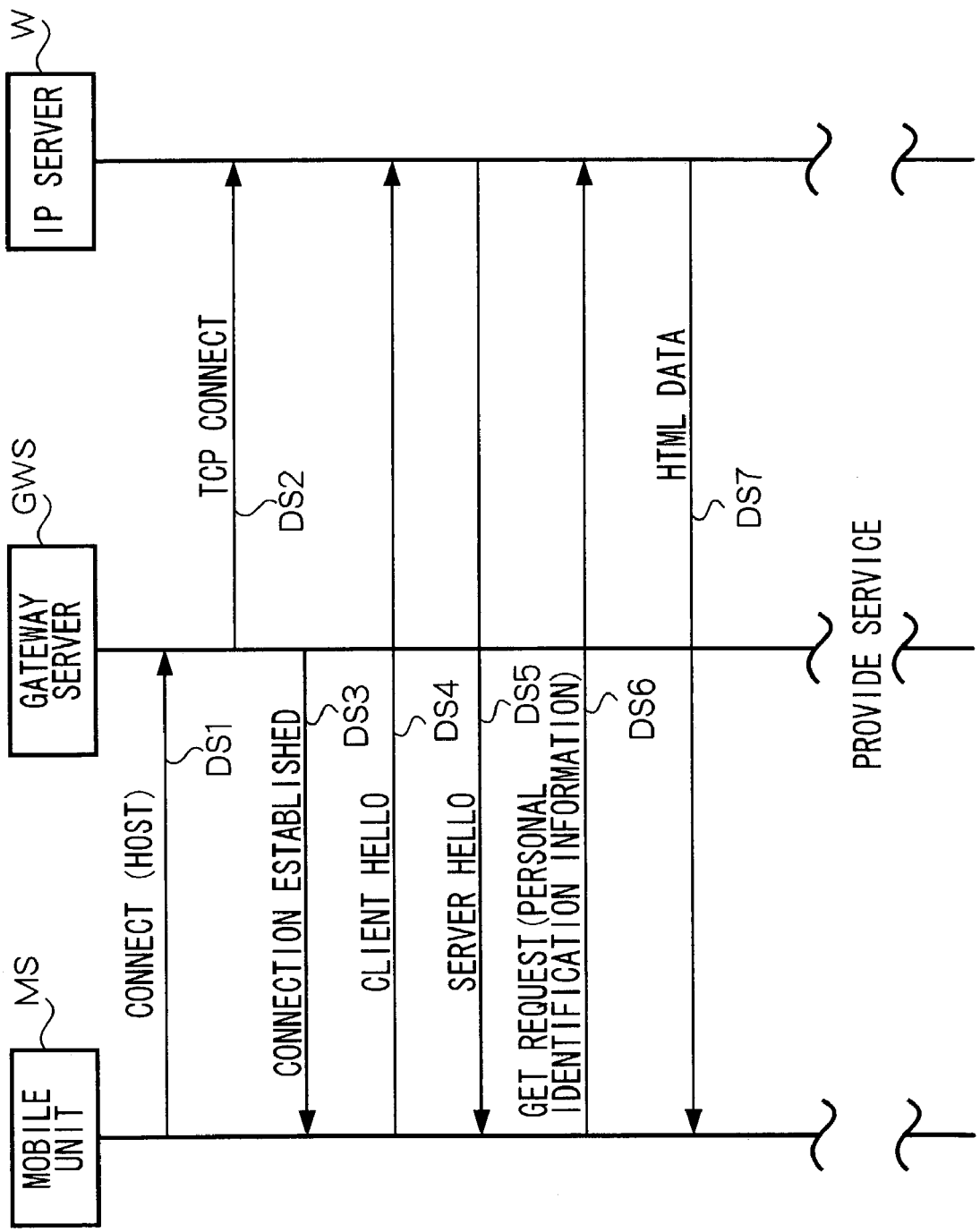
FIG. 13 is a sequence chart showing the flow of a signal in communication system 1 of the same embodiment.

In Process 1, since the process to commence SSL communication is executed by CPU 211 (Step S6), transmission and reception of the data shown in FIG. 13 are carried out in communication system 1. In this process, CPU 211 of mobile unit MS first transmits "connect" signal DS1 to gateway server GWS via transmission and reception unit 22. As signal is DS1 is received, gateway server GWS transmits "TCP Connect" signal DS2 to IP server W. As transmission of signal DS2 to IP server W ends in this manner, gateway server GWS transmits "Connection established" signal DS 3 to mobile unit MS.

On the other hand, as "Connection established" signal DS 3 is received, CPU 211 of mobile unit MS transmits "Client hello" signal DS4 to IP server W. As "Client hello" signal DS4 transmitted from mobile unit MS is received by communication unit 114 of IP server W in this manner, data transmission administering unit 111 transmits "Server hello" signal DS5 to mobile unit MS. As a result of transmission and reception of signals DS1~DS5 explained above, the SSL handshake takes place between mobile unit MS and IP server W, and end to end SSL communication between mobile unit MS and IP server W becomes feasible.

Then, CPU 211 of mobile unit MS executes Step S7, adds personal identification information (in other words, the serial number) "ΔΔΔΔΔΔ" to GET request DS6 containing the URL "https://www.○○ bank.co.jp/index.html" corresponding to the menu item "○○ bank", and transmits to mobile packet communication network MPN (Step S7). Then, CPU 211 stores the URL "http://www.○○bank.co.jp/index.html" as an access record and "1" as request data string flag F in record storage table of flash memory 214 (Step S8).

On the other hand, as GET request DS6 transmitted from mobile unit MS is received by communication unit 114 of IP server W, data transmission administering unit 111 extracts the URL "https://www.○○ bank.co.jp/index.html" added to GET request DS6, and stores in RAM. Then, data transmission administering unit 111, on the basis of the URL stored in RAM, determines whether the service desired by the user of mobile unit MS requires user authentication. And if user authentication is determined to be unnecessary, data transmission administering unit 111 returns the HTML data corresponding to the URL stored in RAM, and ends the process.

On the other hand, in this instance, the service the user of mobile unit desires is a "net banking" service. Hence, in the determination process, data transmission administering unit 111 determines that user authentication is necessary, and extracts personal identification information "ΔΔΔΔΔΔ" added to GET request DS 6, and transmits to authentication unit 112. As personal identification information is transmitted from data transmission administering unit 111 in this manner, authentication unit 112 searches personal identification database 113 with the personal identification information "ΔΔΔΔΔΔ" as the search key. Then, as a result of the search, if personal identification information "ΔΔΔΔΔΔ" is not selected, authentication unit 112 determines that the user of mobile unit MS from which GET request DS 6 was transmitted is not the authorized user, and transmits an order to data transmission administering unit 111 to terminate the process.

On the other hand, in FIG. 5, personal identification information "ΔΔΔΔΔΔ" is stored in personal identification database 113. In this case, authentication unit 112 reads out the user ID "user.a" corresponding to personal identification information "ΔΔΔΔΔΔ" from personal identification database 113, and transmits to data transmission administering unit 111. Then, data transmission administering unit 111 determines that the user of mobile unit MS is the authorized user, and transmits to Internet INET HTML data DS 7 corresponding to the URL "https://www.○○bank.co.jp/index.html" which was stored in RAM.

(ii) Process 2

Figure 14:
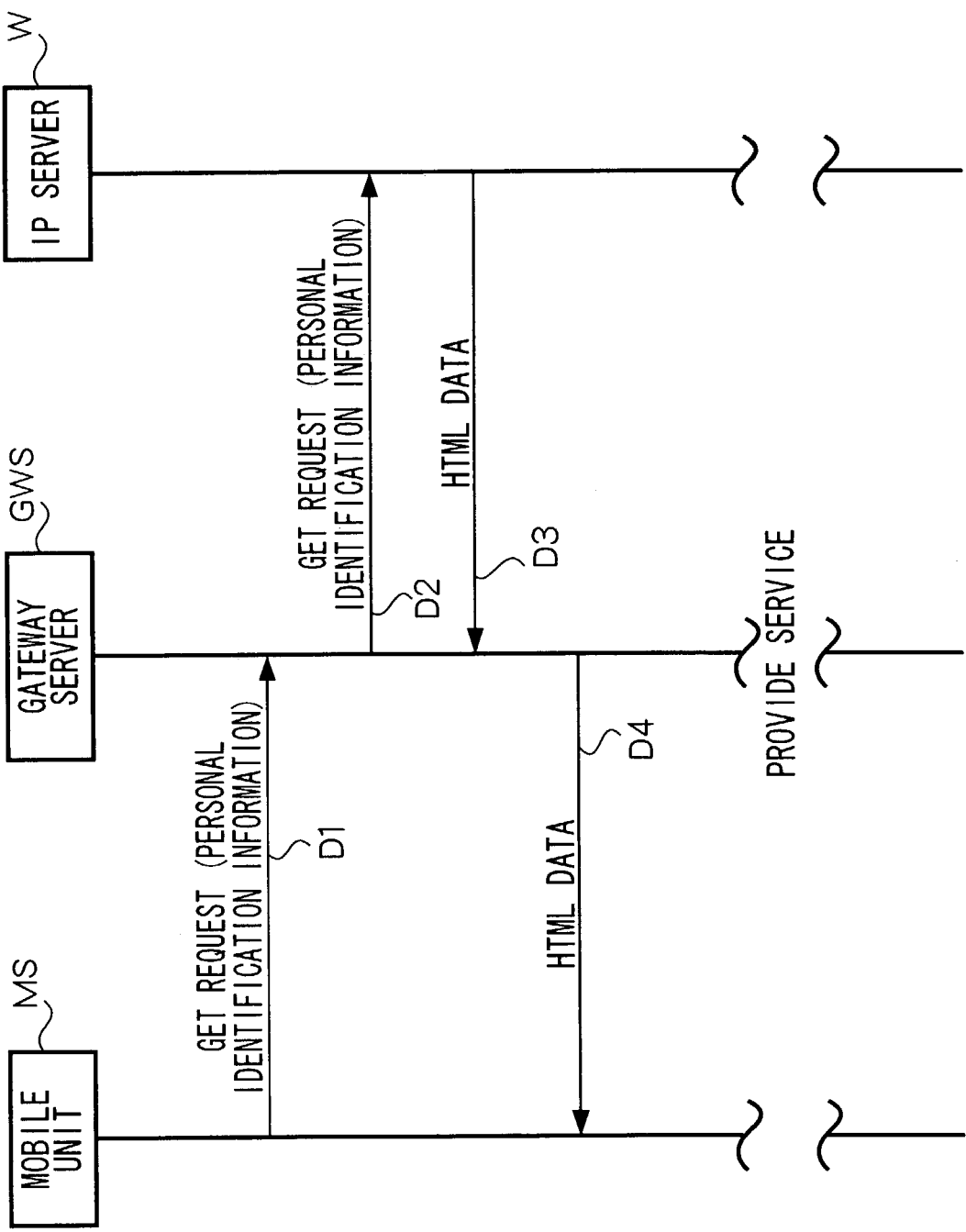
FIG. 14 is a sequence chart showing the flow of a signal in communication system 1 of the same embodiment.

This process is carried out when it is determined that the URL does not designate SSL communication (in other words, Step S5 "No"). As CPU 221 of mobile unit MS executes Process 2, transmission and reception of the data shown in FIG. 14 is carried out in communication system 1. For instance, when a URL such as "http://www.ΔΔ bank.co.jp/index.html#utn" corresponding to the menu item "ΔΔ bank" which begins with "http" is designated, Process 2 is executed.

In Process 2, CPU 211 adds personal identification information (in other words, the serial number) "ΔΔΔΔΔΔ" to GET request D1 containing the URL "http://www. Δ Δ bank.co.jp/index.html#utn" corresponding to the menu item "ΔΔ bank", and transmits to mobile packet communication network MPN (Step S7). Then, CPU 211 stores the URL "http://www.ΔΔbank.co.jp/index.html" as an access record and "1" as request data string flag F in record storage table TBL of flash memory 214 (Step S8). GET request D1 transmitted from mobile unit MS in this manner is received by gateway server GWS thereafter, and its protocol is converted. Then it is forwarded to Inter net INET as GET request D2.

Then, as GET request D2 is received by communication unit 114, a process identical with above-mentioned Process 1 is executed by data transmission administering unit 111, and HTML data D3 corresponding to the URL "http://www.ΔΔbank.co.jp/index.html" is transmitted to Internet INET. Then, it is forwarded as HTML data D4 from gateway server GWS.

Figure 15:
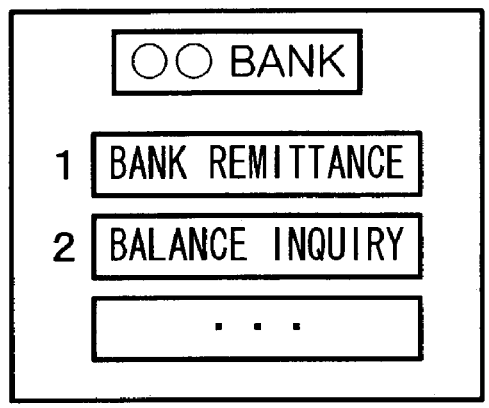
FIG. 15 is a diagram showing an example of an image displayed on liquid crystal displaying unit 24 of mobile unit MS of the same embodiment.

As HTML data D4 or DS7 transmitted after going through the above-mentioned Process 1 or Process 2 is received by mobile unit MS, the image shown in FIG. 15 is displayed on liquid crystal displaying unit 24 of mobile unit MS. At this stage, the URLs to go to the pages to receive provisions of services corresponding to each of the menu items correspond to each of menu items shown in the figure. With regards to the URLs corresponding to each of these menu items, it is optional whether to use the URLs containing personal identification information request data string "utn." If further authentication is necessary, URLs to which personal identification information request data string "utn" is added should be used, and URLs without personal identification information request data string "utn" should be used if user authentication is not necessary.

Figure 11:
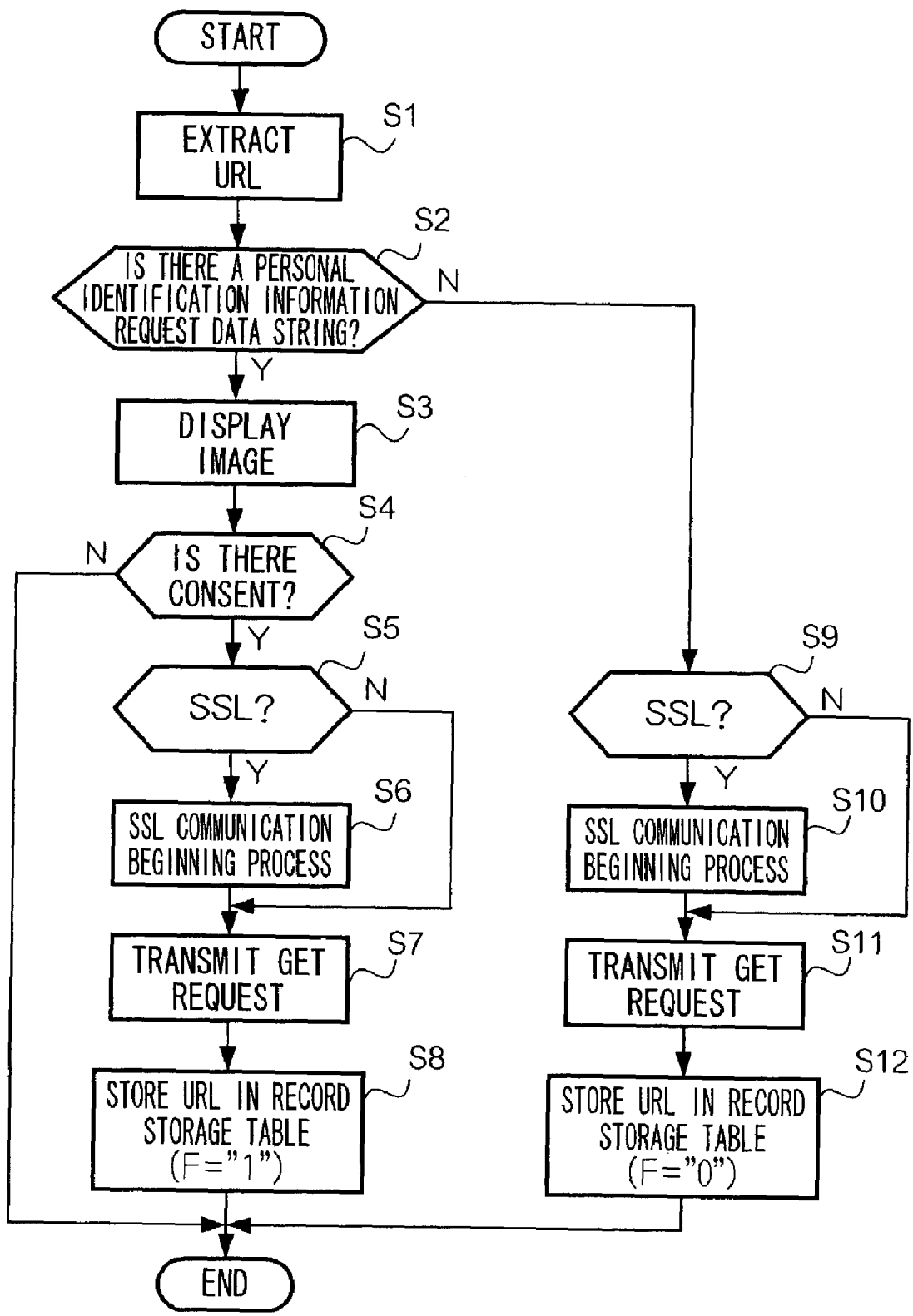
FIG. 11 is a flowchart showing the process carried out by CPU 211 of mobile unit MS in the same embodiment.

At this stage, a user who wishes to pay the rent by bank remittance carries out an inputting operation selecting "bank remittance" through command inputting unit 23 of mobile unit MS. Then, the same process as that of the above-mentioned FIG. 11 is executed by mobile unit MS, and transmits a GET request containing the URL corresponding to "bank remittance" to mobile packet communication network MPN after adding personal identification information "ΔΔΔΔΔΔ." At this stage, on the basis of whether the URL corresponding to the menu item designates SSL communication, a process identical to one of the above-mentioned Process 1, or Process 2 is executed.

Figure 16:
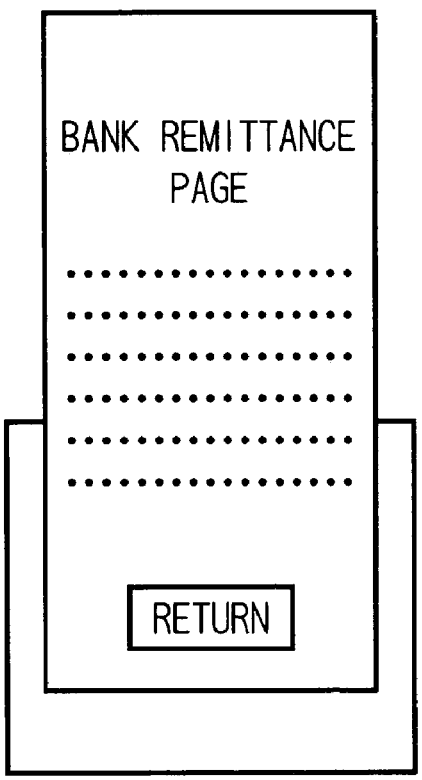
FIG. 16 is a diagram showing an example of an image displayed on liquid crystal displaying unit 24 of mobile unit MS of the same embodiment.

Then, as the HTML data corresponding to the GET request from IP server W is transmitted, the image for bank remittance shown in FIG. 16 is displayed on liquid crystal displaying unit 24 of mobile unit MS. Thereafter, the user carries out inputting operations to input the account number to which the remittance is carried out, the amount corresponding to the rent and so forth. Then the user carries out an inputting operation, which communicates a determination. Then, mobile unit MS transmits the information and a GET request containing personal identification information "ΔΔΔΔΔΔ." As the GET request is transmitted from mobile unit MS in this manner, IP server W extracts several kinds of information from the received GET request, and carries out a bank remittance.

On the other hand, in the instance that there is a deterioration in communication while mobile unit MS is in the process of downloading the HTML data corresponding to the image of FIG. 16, and fails to download the HTML data, mobile unit MS must attempt once again to download the HTML data corresponding to the image of FIG. 16 again. In this case, mobile unit MS reads out request data string flag F in record storage table TBL. Then, the process changes as described below, depending on whether request data string flag F is "0" or "1."

(a) When Request Data String Flag F="1"

In this case, CPU 211 of mobile unit MS, when transmitting a GET request corresponding to the image for rereading, adds personal identification information "ΔΔΔΔΔΔ" to the GET request. For instance, when personal information transmission request data string "utn" is added to the URL such as menu items "○○ bank" or "ΔΔ bank" of the above-mentioned FIG. 10, "1" is stored as request data string flag F in record storage table TBL of mobile unit MS as a result of the process of the above-mentioned Step S8 in FIG. 11. In this case, when the HTML data corresponding to the image is reread, CPU 211 of mobile unit MS adds personal identification information to the GET request and transmits to IP server W. As a result, the image shown in FIG. 16 is displayed on liquid crystal displaying unit of mobile unit MS. Then, services such as "bank remittance" are provided likewise.

(b) When Request Data String Flag F="0"

In this case, CPU 211 of mobile unit MS does not add personal identification information "ΔΔΔΔΔΔ" to the GET request when it transmits GET request containing the URL corresponding to the image for rereading.

Thus, operations of the present embodiment are explained with reference to an instance, where a user carries out bank remittance, but exactly the same process is carried out by communication system 1 when a user of mobile unit MS receives a service specified in a membership contract.

Thus, the configuration of user authentication method of the present embodiment is such that the mobile unit transmits personal identification information to the IP server with the consent of the user, and the IP server carries out user authentication on the basis of personal identification information when the personal identification information request data string is added to the URL contained in the HTML data. Hence, user authentication by using personal identification information can be carried out by every IP without any special contract with mobile communication companies.

Also, the configuration of the mobile unit of the present embodiment is such that it transmits personal identification information only when the user's consent is obtained by displaying the image for obtaining the user's consent on the liquid crystal displaying unit when personal identification information is transmitted. Therefore, it is possible to effectively prevent fraudulent use of personal identification information as a result of transmitting personal identification information without the user's intent.

Also, in the present embodiment, when the search service of the gateway server is used, the URL of a page, which provides a service requiring user authentication, is transmitted after adding the personal identification information request data string. Therefore, even when the IP server is accessed by using the search service, user authentication can be ensured with more certainty because the GET request is transmitted with personal identification information.

Furthermore, in the present embodiment, the HTML format is used as the format for the data transmitted from an IP server and so forth; therefore, the present invention can be effective even when existing facilities are used.

In the present embodiment, the configuration in which the serial number of mobile unit MS as unique personal identification information is used was explained, but information such as the telephone number of mobile unit MS can be used as well.

In the present embodiment, the data string "utn" is used as personal identification information, but different data strings can also be used without any problem.

In the present embodiment, the case in which mobile unit MS performs communication via mobile packet communication network MPN was explained. But the present invention is not limited to this process, and it can be adapted so it can perform communication also by using a terminal such as a personal computer, which belongs to a fixed telephone network. In this case, the same process as that of the above-mentioned embodiment can be executed by equipping the personal computer with the same function as that of mobile unit MS of the above-mentioned embodiment.

The data transmitted to mobile unit MS from IP server W or gateway server GWS in the present embodiment are explained as data in HTML format. However, the present invention is not limited to the HTML format, and other markup languages such as XML (eXtensive Markup Language) can be used as well.

1-3. MODIFICATION EXAMPLES

Modification Example 1

In the present embodiment, the configuration is such that a search service is provided to mobile unit MS by equipping gateway server GWS with a search function. However, the source of the search service can be the search engine on Internet INET as opposed to gateway server GWS. In this case, the same effect as that of the present embodiment can be achieved by equipping the search engine with a search database.

Modification Example 2

In the present embodiment, the configuration is such that the search of the search database is carried out by gateway server GWS in accordance with the keyword transmitted from mobile unit MS. However, many of the services transmitted from gateway server GWS to mobile unit MS can be carried out in a different fashion. For instance, the configuration of setting up menu items corresponding to several kinds of services such as "net banking" or "game" on the homepage of gateway server GWS, and producing pages corresponding to each menu item is possible. In this case, for instance, menu items such as "○○ bank" are set up in pages corresponding to each of these menu items. Then, personal identification information request data string "utn" is added when the URL corresponding to the menu is designated by an anchor tag. The user of mobile unit MS can find the required site on gateway server GWS by this configuration.

Modification Example 3

In the present invention, the configuration is such that IP server W carries out user authentication only in accordance with personal identification information transmitted from mobile unit MS. However, the configuration of using other information is possible to ensure user authentication with more certainty. For instance, methods below can be options.

i) Method a

In this method, the user is prompted to input his/her password after user authentication is carried out on the basis of personal identification information.

The memory content of personal identification database 113 is altered as shown in FIG. 17 when this method is adopted. In other words, personal identification information and the password are stored in correspondence to each user ID. At this stage, the password is the one given by the IP when the IP and the user of mobile unit MS sign the contract of service provision.

Then, data transmission administering unit 111 of IP server W, as GET request DS6 or D2 to which personal identification information is added (FIG. 13, FIG. 14) is transmitted from mobile unit MS, extracts the URL added to GET request DS6 or D2, stores the URL in RAM, extracts personal identification information from GET request DS6 or D2, and transmits to authentication unit 112. Authentication unit 112 searches personal identification database 113 on the basis of the personal identification information, reads out the user ID corresponding to the personal identification information, and transmits to data transmission administering unit 111.

Then, as the user ID is transmitted from authentication unit 112, data transmission administering unit 111 stores the user ID in RAM, and transmits the HTML data corresponding to the image for inputting a password and so forth (hereinafter, referred to as "password inputting image") as shown in FIG. 18 to Internet INET.

While the password inputting image shown in FIG. 18 is displayed on liquid crystal displaying unit 24 after the HTML data is received by mobile unit MS, and as inputting operations to input the password and the user ID in command inputting unit 23 of mobile unit MS to communicate a determination are carried out, controlling unit 21 of mobile unit MS transmits a GET request containing the passwords and so forth, to mobile packet communication network MPN. As the GET request is received, data transmission administering unit 111 of IP server W extracts the password and the user ID from the GET request, and transmits to authentication unit 112.

Authentication unit 112 reads out from personal identification database 113 the password corresponding to the user ID transmitted from data transmission administering unit 111. Then, authentication unit 112 determines whether the password read out and the password transmitted from data transmission administering unit 111 accord, and transmits the outcome of the authentication to data transmission administering unit 111. Then, data transmission administering unit 111 provides a service only when the user is determined to be the authorized user as a result of the user authentication.

In this case, the authentication method can be altered whenever IP server W provides a service for the necessity of ensuring security, or user authentication can be carried out only by personal identification information. Also, the configuration of transmitting biometrical information such as fingerprints instead of the password is possible as well. ii) Method b In this method, the user is prompted to input the user ID when mobile unit MS transmits personal identification information, and user authentication is carried out by transmitting the user ID inputted by the user and personal identification information to IP server W.

In this case, a box for inputting the user ID is added to the image displayed on liquid crystal displaying unit 24 of mobile unit MS (FIG. 12) in the above-mentioned Step S3 of FIG. 11. FIG. 19 is a diagram showing an example of the image displayed on liquid crystal displaying unit 24 of mobile unit MS in this case. At this stage, as the user inputs his/her user ID, and hits the transmission button while the image shown in the figure is displayed, controlling unit 21 of mobile unit MS transmits GET request DS6 or D2 to which the inputted user ID and personal identification information are added (FIG. 13, FIG. 14) to mobile packet communication network MPN.

On the other hand, in IP server W, data transmission administering unit 111 extracts personal identification information and the user ID from GET request DS6 or D2, and transmits to authentication unit 112. Authentication unit 112 carries out user authentication on the basis of the transmitted information. Specifically, authentication unit 112 reads out from personal identification database 113 the personal identification information corresponding to the user ID transmitted from data transmission administering unit 111, and determines whether the personal identification information and the personal identification information transmitted from data transmission administering unit 111 accord. Then, authentication unit 112 transmits the authentication outcome to data transmission administering unit 111. Data transmission administering unit 111 provides a service only when the user is determined as the authorized user as a result of user authentication.

Ensuring user authentication becomes possible not only by using personal identification information, but also by using other authentication methods along with this method in this manner. In particular, with regard to a service pertaining to the property of the user such as "net banking", it is very effective to carry out user authentication using more than one method, as opposed to carrying out user authentication on the basis of personal identification information alone.

Modification Example 4

Figure 20:
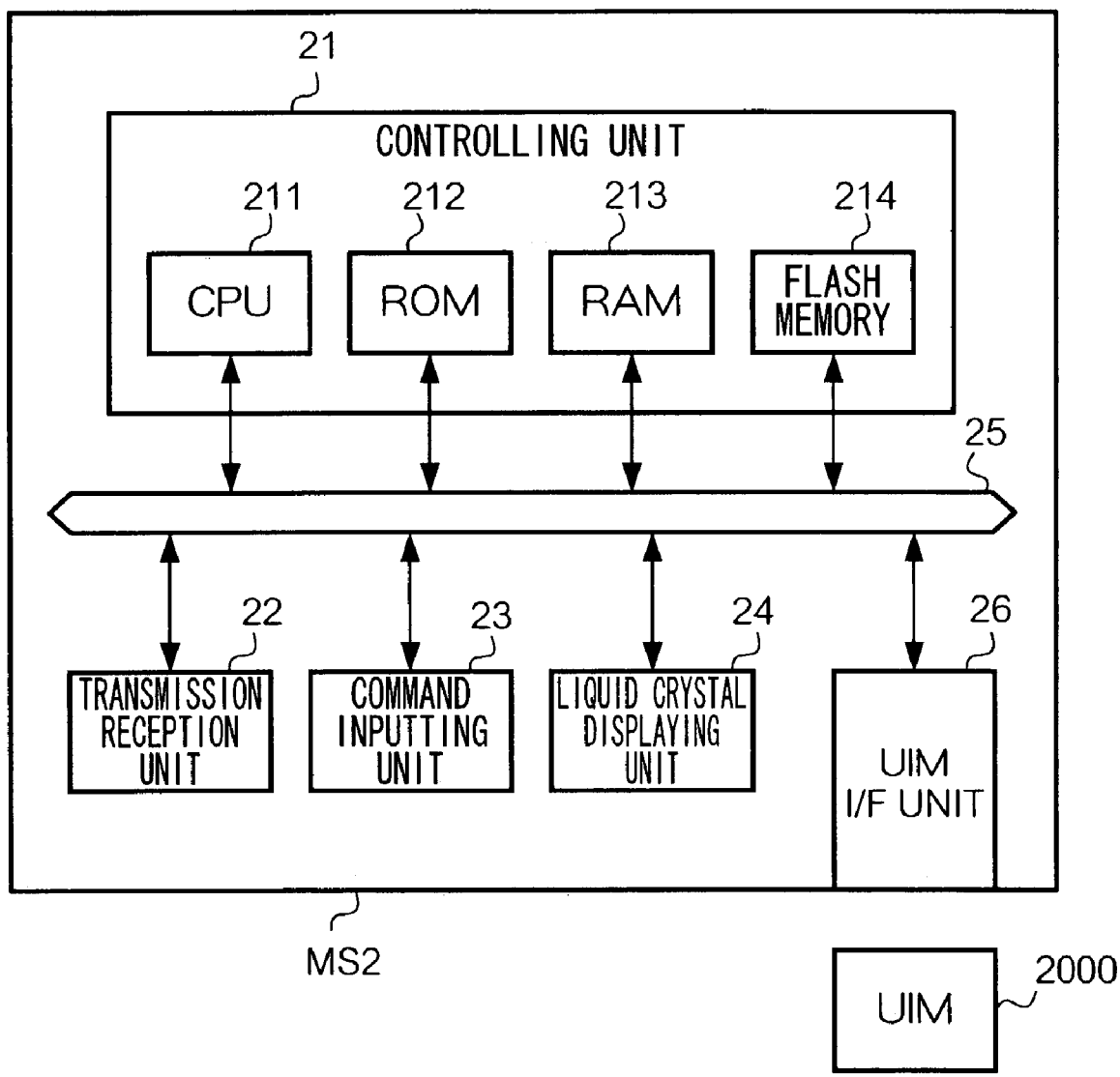
FIG. 20 is a block diagram showing a configuration of mobile unit MS2 in modification example 3.

FIG. 20 is a block diagram showing the configuration of mobile unit MS 2 of the present modification. Identical codes are given to the elements in the figure, which are the same as those in the above-mentioned FIG. 7.

As a characteristic configuration of the present modification, mobile unit MS is equipped with UIM interface unit 26 to connect UIM (User Identity Module) 2000 (hereinafter, "interface" is abbreviated as "I/F"), and is used by being connected with UIM. At this stage, UIM 2000 is a module containing some information inherent to the user such as the membership number of the user. Controlling unit 21 of mobile unit MS 2 exchanges the data with UIM 2000 by UIM I/F unit 26, and receives the packet exchange service of mobile packet communication network MPN. Also, in the present modification, for instance, the membership number is issued for each UIM 2000 as SIM of GSM (Global System for Mobile Communications), and charging is carried out to each UIM 2000.

Figures 21, 22:
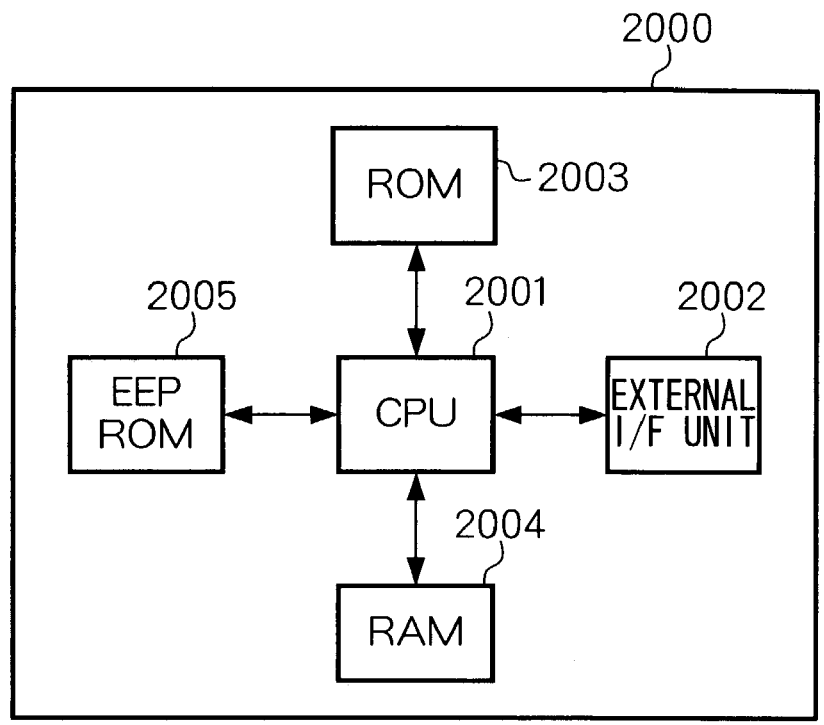
FIG. 21 is a block diagram showing a configuration of UIM 2000 in the same modification example.
FIG. 22 is a diagram showing memory content of personal identification database 113 of the same modification example.

Next, UIM 2000 will be explained in greater detail. FIG. 21 is a block diagram showing the configuration of UIM 2000. As shown in the figure, UIM 2000 consists of CPU 2001, external I/F unit 2002, ROM 2003, RAM 2004, and EEPROM 2005.

External I/F unit 2002 relays transmission and reception of the data between CPU 2001 and UIM I/F unit 26 of mobile unit MS2. ROM 2003 is a fixed memory, and stores the controlling program and the program for analyzing, executing, and responding to the controlling command provided by mobile unit MS 2 along with data administration. CPU 2001 controls each unit of UIM 2000 by executing the program stored in ROM 2003. RAM 2004 is used as the work area of CPU 2001. In EEPROM 2005, are stored information inherent to users such as the membership numbers, and information such as the serial number of UIM 2000.

At this stage, among the services provided to mobile unit MS2 by IP server W, some of these transmit character contents, music contents and so forth. A fee for these services is charged according to the contents of these services; therefore, a user is not charged a second time for the same is service when a request for transmission is received. Hence, in the communication system, which places a service charge according to a UIM as in the present modification, downloading identical contents fraudulently, by a plurality of mobile units MS 2 on the basis of a single service charge by using identical UIM 2000 is possible. Hence, in the present modification, the configuration is such that user authentication is carried out by information unique to UIM 2000 (in the present modification, "the serial number of UIM 2000") as personal identification information as opposed to by the serial number of mobile unit MS2 alone.

Hereinafter, with regard to the operations of the present modification example, the portions different from the above-mentioned embodiment are explained.

First, in mobile unit MS 2 in the present modification, the same process as that carried out in Steps S1~S6 shown in FIG. 11 is executed. Then, when mobile unit MS2 transmits a GET request in Step S7 in FIG. 11, CPU 211 requests UIM 2000 for transmission of the serial number of UIM 2000. CPU 2001 of UIM 2000 reads out the serial number from EEPROM 2005 as the transmission request for the serial number is sent from mobile unit MS2, and transmits to mobile unit MS2 via external I/F unit 2002.

Then, CPU 211 of mobile unit MS2 transmits a GET request to which the serial number of UIM obtained from UIM 2000 is added to mobile packet communication network MPN along with the serial number of mobile unit MS 2 read out from ROM 212. IP server W carries out user authentication on the basis of the serial number of mobile unit MS 2 and the serial number of UIM 2000 added to the GET request.

As a result, the memory content of personal identification database 113 of IP server W is altered as shown in FIG. 22. In other words, the serial number of mobile unit MS 2 and the serial number of UIM are stored as personal identification information corresponding to each user ID. Authentication unit 112 determines whether the two serial numbers transmitted from mobile unit MS 2 and information stored in personal identification database 113 accord, and determines that authentication has been successful when they accord.

According to the present modification, the configuration is such that user authentication is carried out by using not only the serial number of the mobile unit but also the serial number of UIM as personal identification information in this manner. Hence, simplicity, certainty, and trustworthiness of authentication can be ensured not only when calculating a service charge according to the mobile unit, but also for a system according to a module such as UIM.

The invention claimed is:

1. A user authentication method comprising:
   a reception process for a cellular terminal belonging to a first network to receive data from said first network;
   a detection process for said cellular terminal to detect whether a specific data string exists in data received in said reception process;
   a transmission process for said cellular terminal to transmit personal identification information for identifying a user pre-stored in said cellular terminal with certainty, only when said data string is determined to exist in said detection process;
   a forwarding process for a relaying device which relays transmission and reception of data between said first network and a second network to forward personal identification information transmitted from said cellular terminal to said second network; and
   an authentication process for a server being connected to said second network to authenticate a user of said cellular terminal on the basis of said personal identification information.

2. A user authentication method according to claim 1
   wherein said cellular terminal, in said transmission process, transmits said personal identification information in a format, which cannot be deciphered by devices other than said server; and
   wherein said server, in said authentication process, deciphers said personal identification information, and authenticates a user of said cellular terminal on the basis of the personal identification information.

3. A user authentication method according to claim 1 further comprising:
   a search process for said relaying device to search for an address of said server in said second network in accordance with a request from said cellular terminal;
   wherein said data said cellular terminal receives in said reception process is data corresponding to a search outcome as a result of a search carried out by said relaying device in said search process.

4. A user authentication method according to claim 1
   wherein said data is written in a markup language; and
   wherein said data string is a specific identifier contained in said data.

5. A user authentication method according to claim 1 further comprising:
   a determination prompting process for said cellular terminal to prompt a user of itself to determine whether said personal identification information can be transmitted only when said data string is determined to exist in said detection process;
   wherein said cellular terminal, in said transmission process, transmits said personal identification information only when a permission of the user is obtained in said determination prompting process.

6. A user authentication method according to claim 5
   wherein said cellular terminal, in said determination prompting process, displays an image to prompt the user's determination, and prompts the user to enter input identification information;

wherein said cellular terminal, in said transmission process, transmits input identification information inputted by the user along with said personal identification information; and wherein said server, in said authentication process, carries out user authentication on the basis of personal identification information transmitted in said transmission process and said input identification information.

7. A user authentication method according to claim 1 further comprising a transmission process for said server for transmitting input data to prompt said cellular terminal to enter input identification information after said authentication process;

a process for said cellular terminal which receives said input data transmitted in said transmission process to prompt a user to input said input identification information on the basis of the input data;

a second transmission process for transmitting input identification information inputted in said process for prompting input; and a second authentication process for authenticating a user of said cellular terminal on the basis of said input identification information transmitted in said second transmission process.

8. A user authentication method according to claim 1 wherein said personal identification information is a serial number of said cellular terminal.

9. A user authentication method according to claim 1 wherein said personal identification information consists of a combination of a serial number of said cellular terminal and information stored in a user identification module which is connected with said cellular terminal.

10. A user authentication method according to claim 1 wherein said first network is a mobile communication network; and wherein said cellular terminal is a mobile unit, which carries out communication via said mobile communication network.

11. A communication system comprising:

a cellular terminal for transmitting to said first network, personal identification information for identifying with certainty a user pre-stored in a terminal, by receiving data from a first network, determining whether a specific data string exists in the data, and only when said data string is determined to exist;

a second network which is connected with said first network via a relaying device; and a server which is connected with said second network for carrying out authentication on the basis of said personal identification information.

12. A cellular terminal comprising a communication unit for carrying out communication with others via a first network; and a controlling unit, by carrying out communication, via said first network and a second network being connected with the first network, with a server in the second network by said communication unit, for reading out personal identification information from memory installed in the cellular terminal or a memory connected with the cellular terminal, and transmitting the personal identification information to said server via said connection, when data containing a specific data string is received from the server.

13. A program causing a computer to execute:

a process of reading out personal identification information from memory installed in the cellular terminal or memory connected with the cellular terminal, and transmitting the personal identification information to said server by said communication unit by carrying out communication, via a first network and a second network being connected with the first network, with a server in the second network by a communication unit, when data containing a specific data string is received from the server.

14. A recording medium storing:

a program for prompting a computer to execute a process of reading out personal identification information from memory installed in a cellular terminal or memory connected with the cellular terminal, and transmitting the personal identification information to said server by said communication unit by carrying out communication by a communication unit, via a first network and a second network being connected with the first network, with a server in the second network when data containing a specific data string is received from the server.

* * * * *